United States Patent [19]
Clark et al.

[11] Patent Number: 5,942,116
[45] Date of Patent: Aug. 24, 1999

[54] ANAEROBIC SLUDGE DIGESTER

[76] Inventors: Sidney E. Clark, 305 Blueridge Parkway, Madison, Wis. 53075-2401; John R. Currie, 505 Blackhawk; John J. Fassbender, 15144 Theisen Trail, both of Batavia, Ill. 60510

[21] Appl. No.: 08/905,487

[22] Filed: Aug. 1, 1997

[51] Int. Cl.$^6$ .................................................. C02F 3/28
[52] U.S. Cl. ..................... 210/603; 210/608; 210/194; 210/197; 210/525
[58] Field of Search ..................... 210/194, 197, 210/523, 525, 539, 540, 603, 608, 629

[56] References Cited

U.S. PATENT DOCUMENTS

| | | | |
|---|---|---|---|
| 1,099,396 | 6/1914 | Rothwell | 210/197 |
| 2,439,633 | 4/1948 | Reinhart | 210/525 |
| 3,219,189 | 11/1965 | Moore | 210/540 |
| 3,224,964 | 12/1965 | Derenk et al. | 210/540 |
| 3,951,816 | 4/1976 | Bascope et al. | 210/525 |
| 4,482,458 | 11/1984 | Rovel et al. | 210/603 |
| 4,664,794 | 5/1987 | Mackrle et al. | 210/197 |
| 4,994,179 | 2/1991 | Keeter et al. | 210/525 |
| 5,015,384 | 5/1991 | Burke | 210/603 |
| 5,089,118 | 2/1992 | Mahoney | 210/525 |
| 5,409,610 | 4/1995 | Clark | 210/603 |

*Primary Examiner*—Christopher Upton
*Attorney, Agent, or Firm*—Marshall, O'Toole, Gerstein, Murray & Borun

[57] ABSTRACT

An anaerobic sludge digester has a top, a bottom, sloped sides leading to the bottom, and a draft tube with an upper end spaced downward of the top of the digester and a lower end spaced upward of the bottom of the digester. The draft tube may have a propeller, impeller, or jets that enable liquid to be transported through the draft tube from one part of the digester to another. The digester has a discharge mouth positioned within the digester to receive heavy material that is pumped from the bottom of the digester and which flows outward across the liquid surface. One or more spray nozzles are located above the liquid surface to break up foam and emulsions. The mouth may also be used to effectively remove scum and light solids from the liquid surface. A shutoff valve on a discharge pipe extending from the discharge mouth can be closed while sludge is added to the system, causing the liquid level to rise above the mouth. After the spray nozzles are used to create a swirl in the surface liquid, the shutoff valve can be opened to draw in significant quantities of scum and light solids.

23 Claims, 13 Drawing Sheets

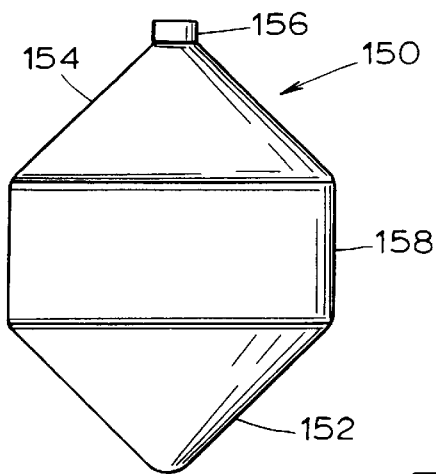
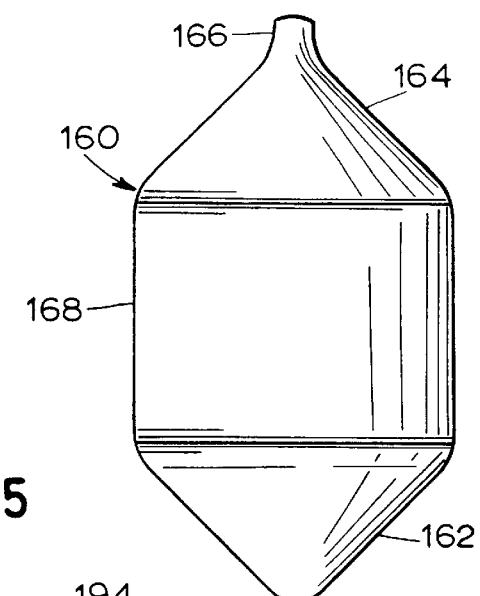
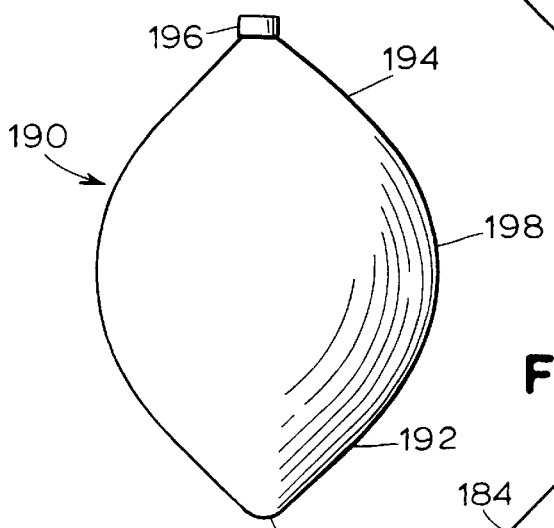
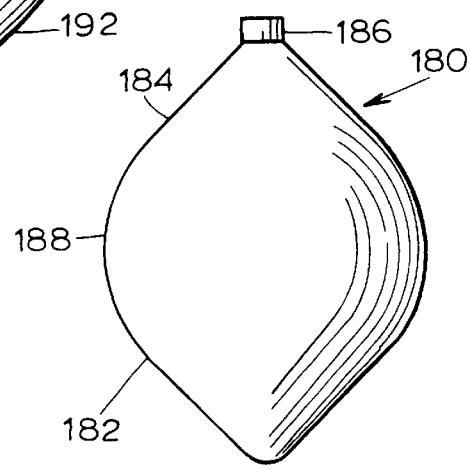
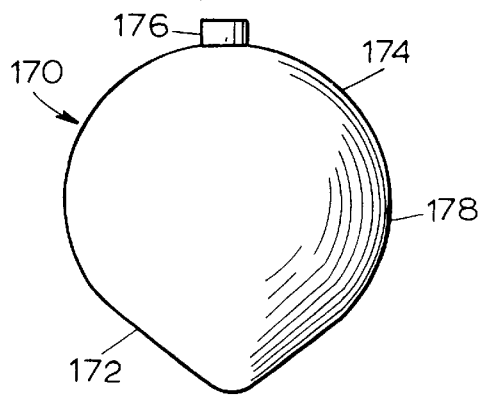

ANAEROBIC SLUDGE DIGESTER

BACKGROUND OF THE INVENTION

This invention relates in general to apparatus and methods for anaerobic digestion of sludges produced in water treatment processes cur the like. More particularly, it relates to systems for removing heavy solids that settle to the bottom of digester vessels and controlling the accumulation of light solids that rise to the surface of such digesters and may exhibit a tendency to form foam, froth, or emulsions.

A wide variety of sludges are treated in anaerobic digesters. Historically, anaerobic sludge digestion has been used for stabilizing primary clarifier sludges. More recently, it has been applied to biological sludges produced by activated sludge or trickling filter processes, and to sludge mixtures containing significant industrial waste contributions. Municipal sewage sludges typically have significant quantities of manufactured products ranging from fibrous toiletry products to plastics, or other synthetic products ranging from long filaments to sheets of bulky materials. Modern biological secondary treatment plants often produce significant quantities of aerobic microorganisms that are not easily decomposed in an anaerobic digester. In almost all cases, the raw sludge sent to an anaerobic digester is a very diverse and complex mixture of materials ranging from simple inert silt, sand, and soil particles to very complex organic molecules and particles.

During anaerobic digestion, materials are segregated in a variety of ways. Some relatively light materials entrap rising gas bubbles and are transported to the liquid surface in the digester. Similarly, some of the microscopic biomass in raw sludge retains microscopic bubbles and is transported to the surface. Other materials having a specific gravity less than the digester liquid in which they are suspended rise through natural buoyancy. At the surface, these materials can create a foam or froth layer, in which little digestion occurs. The fibrous and string-type materials typically found in municipal sludges tend to become entangled with each other and accumulate in a scum layer at the liquid surface. This scum layer can include mats and ropes that hinder the digestion process.

In contrast, inert heavy materials settle to the bottom of the digester. Conventional American anaerobic digesters have a large relatively level floor, where the heavy materials remain relatively stationary.

Recently, German-style tall cylindrical or egg-shaped digesters have started to be used in the United States and Canada. Some of these digesters are provided with a vertical draft tube located on the central axis of the digester. The draft tube includes motor-operated pumps or jets that provide a mechanism for mixing the liquid in the digester by pumping large quantities of anaerobic digester liquid from the bottom of the digester to the top, and vice versa.

Heavy materials are typically removed from the floor through a discharge pipe extending from the bottom of the digester. In German-style digesters, the discharge pipe for removing heavy materials from the bottom of the digester leads to an externally mounted discharge chamber located near the top of the digester. The discharge chamber is located near the top of the digester so the discharge pipe can act as a standpipe to control the liquid level in the digester. The typical discharge standpipe terminates in an adjustable telescoping valve in the form of a sliding pipe that can be raised or lowered, typically within a 3- to 4-foot range. This discharge system requires frequent flushing and/or pressurized back-flushing to clear clogs in the discharge pipe or at its mouth near the bottom of the digester. The difficulties in moving heavy bottom material upward through a relatively small diameter pipe (which usually has sloped zones and several fittings or elbows) has proven difficult and troublesome in egg-shaped digesters recently installed in the U.S. and Canada.

Foam control in tall cylindrical and egg-shaped digesters varies. When the digester includes a draft tube with motor-operated pumps, foam control generally depends upon the liquid drawn up through the draft tube splashing over the top of the foam to knock it down, or drawing the foam into the draft tube for transport to the bottom of the vessel. Some German facilities without a central draft tube have incorporated a mechanical mixer that stirs the liquid surface and also breaks up scum.

Other systems that do not utilize a draft tube have provided a spray nozzle or nozzles above the liquid surface to minimize foam formation. These nozzles are pointed at an angle at the liquid surface. In some applications, spray systems with moderate discharge velocities and multiple nozzles have been reasonably effective. However, the effectiveness is directly related to the nature and quantity of the raw sludge loaded to the system. The closer a system gets to the design load or maximum sustained load, the more difficult it may become to control foam, froth, and/or emulsions. Furthermore, raw sludges that contain large quantities of waste-activated sludge can create difficult and special problems related to the fibrous microorganisms that are created in the process. The typical German and American foam-control systems utilized to date have not proven effective with these types of sludges.

Tall cylindrical and egg-shaped digesters typically have a scum discharge funnel located near the top of the digester. The funnel has a vertical mouth that faces the central vertical axis of the digester. When the level of liquid in the digester is high, significant quantities of digester surface material are drawn into the mouth of the funnel. As material is withdrawn and the liquid level drops, the cross-sectional area of the mouth under the surface level decreases until the bottom of the funnel mouth is reached, at which point scum discharge stops. This system was developed to allow large chunks of scum or other liquid surface accumulations to be drawn out of the vessel. Unfortunately, the system is not very effective.

An alternate method of scum removal uses one or more doors that can be opened on the side of the digester to allow surface materials either to spill out or to be manually raked out of the digester by hand. This method creates significant health and safety risks.

New apparatus and methods are needed to provide improved, more effective, and more reliable means and methods for removing heavy materials from the bottom of a digester; for foam, froth, and emulsions suppression and control; and for removing fibrous and/or matted top materials from the top of a digester.

SUMMARY OF THE INVENTION

The present invention offers a comprehensive system that solves these related problems, is simple to construct, and is easy and reliable to operate.

According to one embodiment of the invention, an anaerobic sludge digester is provided with a substantially vertical draft tube with an upper end near the top of the digester and a lower end near the bottom of the digester. Raw sludge is fed to the digester in a pressurized stream through a side swirl mix jet nozzle. Liquid accumulates in the digester to a level slightly higher than the upper end of the draft tube.

Digester liquid is periodically drawn from the lower end of the digester and returned to the digester through one or more high-velocity spray jet nozzles located over the liquid surface near the top of the digester. The foam spray nozzles are disposed at an angle with respect to the liquid surface to provide optimum energy necessary to suppress foam, froth, and/or emulsions on or in the liquid surface. The nozzle or nozzles are also positioned to create a swirling motion in the top surface of the digester liquid without requiring any additional mixing. The digester includes an internal collection and discharge system that can be used both for removing heavy solids from the bottom of the digester and for removing scum or light solids from the top of the digester. The discharge system includes an overflow weir mouth located within the digester. The elevation of the mouth can be set anywhere within a range which may vary from slightly below to slightly above the top of the draft tube, depending on the operation of the system. The mouth can be formed as a weir discharge trough, a simple standpipe trough, or a funnel-shaped weir trough. A discharge conduit extending from the mouth has a shutoff valve that may be periodically closed as raw sludge is fed to the digester, causing the surface level of the digester liquid to rise. As the spray jet nozzles cause the surface to swirl, the shutoff valve may be opened to allow large quantities of digester liquid with relatively high concentrations of light, fibrous, and matted material to flow out the discharge conduit.

The digester is believed to be unique in that heavy solids from the bottom of the digester or light solids from the top of the digester can be collected and discharged through the same internal discharge system. Heavy solids are periodically transported from the bottom of the digester through the draft tube. Upon reaching the surface, the heavy solids spread, flowing away from the draft tube in all directions. A portion of the heavy solids reach and are discharged through the mouth of the discharge system. Unlike in conventional German-style digesters, no separate mechanism for pumping the heavy solids upwardly is required. The internal collection and discharge system replaces the external chamber utilized in conventional German-style digesters.

BRIEF DESCRIPTION OF THE DRAWINGS

The invention may be better understood by referring to the accompanying drawings, in which:

FIGS. 1–5 are elevational views of prior art anaerobic sludge digesters used in Germany;

DETAILED DESCRIPTION OF THE DRAWINGS

Figure 6:
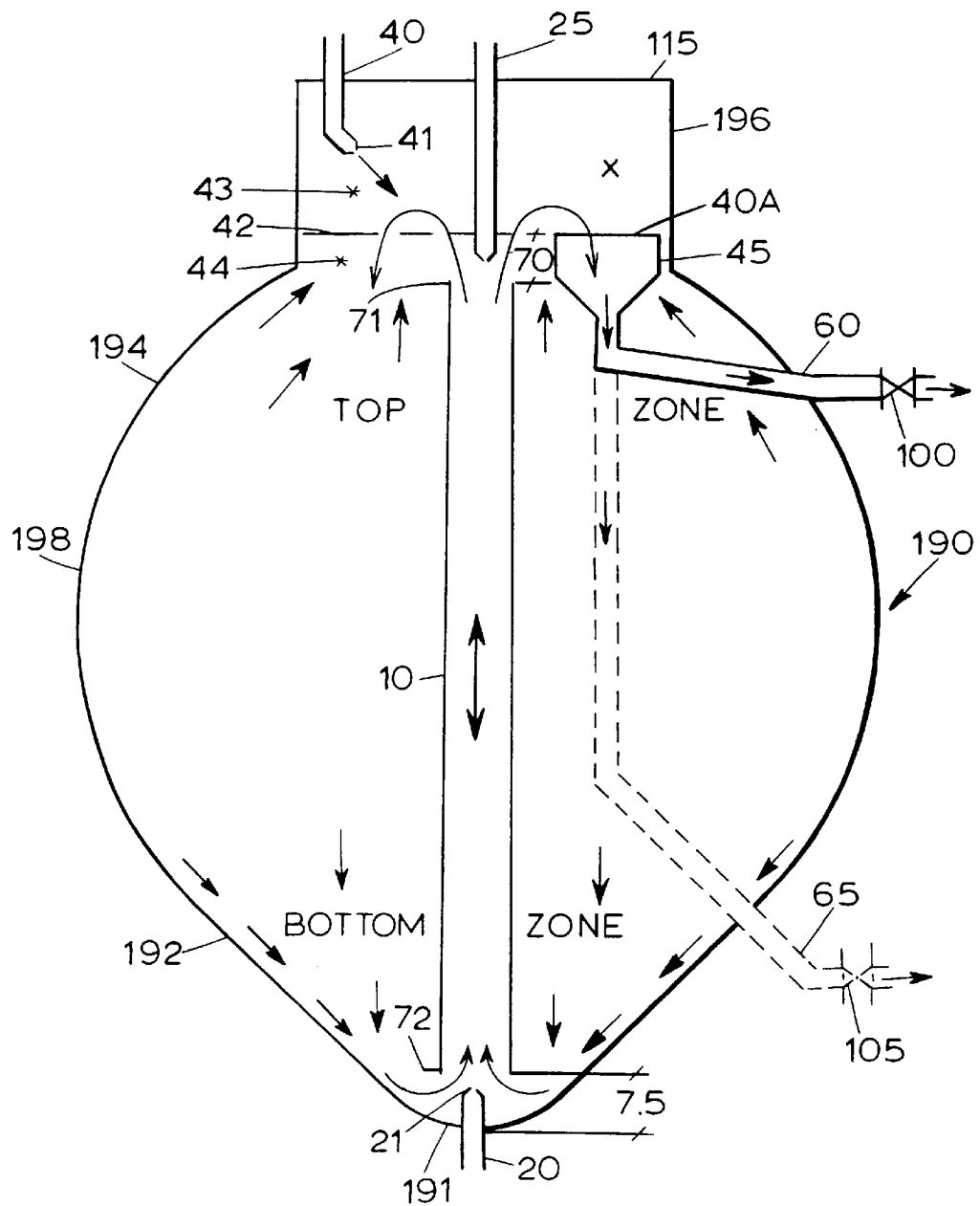
FIG. 6 is an elevational view of an anaerobic sludge digester in accordance with the present invention.

FIG. 1 through FIG. 5 show various anaerobic sludge digester vessel shapes that can be used in practicing the present invention.

The digester 150 shown in FIG. 1 has a conical bottom section 152, a circular cylindrical middle section 158, a conical top section 154, and a gas-collecting cylindrical top section 156.

FIG. 2 illustrates a taller modification of the digester shown in FIG. 1. The digester 160 has a conical bottom section 162, a circular cylindrical middle section 168 that is taller than the corresponding section 158 of the digester shown in FIG. 1, a conical top section 164, and a cylindrical gas-collecting section 166.

FIG. 3 illustrates a digester 170 characterized by a low height-to-diameter ratio, which is useful in facilities that have digester height constraints. The digester has a conical bottom section 172 joined to a spherical section 178 (which replaces the cylindrical section 158 or 168 of the digesters in FIGS. 1 and 2). The spherical shape continues to a cylindrical gas-collecting section 176.

The digester 180 illustrated in FIG. 4 has a conical bottom section 182, a spherical middle section 188, a conical top section 184, and a cylindrical gas-collecting cylindrical top section 186.

FIG. 5 illustrates the "egg-shape" preferred for large digesters constructed in Germany. The digester 190 has a gas-collecting cylindrical top section 196. A conical bottom section 192 provides a steep-sided transition to a small bottom 191. A conical top section 194 allows a gradual transition to the gas-collecting top 196.

All of the digesters illustrated in FIGS. 1 to 5 have a central vertical axis and are circular in horizontal section for most of their height. They all have a wide middle section and gradually decrease in width from the middle section to a top section and a bottom section.

The conical bottom section of the illustrated digesters has an important function. It funnels heavy digester liquid to a central location on the bottom of the digester, where the lower end of a draft tube is located and provides mixing action (described below). The slope of the bottom cone section is adequate to ensure that sludge (particularly heavy or high-specific-gravity solids) will not settle away from the lower end of the draft tube and thus be isolated from that mixing action. In order to perform this funneling function, the conical bottom sections of the digesters illustrated in FIGS. 1 to 5 (and of other digester shapes in connection with which this invention could be used) desirably have a steep side slope of at least 15 degrees, and desirably at least 45 degrees from the horizontal.

The shape and height of the middle section of the digester, which provides most of the vessel volume, is largely dictated by process volume requirements and facility site conditions. The process volume requirements are set by the amount of sludge to be treated and the degree of stability that is desired in the final digested sludge product. In general, the overall digester height (or depth) should be at least 0.8 times and desirably at least 1.5 times greater than the major diameter of the digester.

The conical top section of the illustrated digesters provides a transition between the middle section and concentrated mixing (also described below) that occurs near the top of the draft tube. It also minimizes the liquid surface area available for foam and scum formation and accumulation. The slope of the conical top section should be at least 15 degrees, and desirably up to about 45 degrees, from horizontal.

The digesters 190 illustrated in FIGS. 6–17 have a preferred shape for a digester in accordance with the present invention. While the shape is comparable to that shown in FIG. 5, it is believed that the invention would also provide benefits with other digester shapes comparable to those shown FIGS. 1 to 4.

MIXING AND THE DISCHARGE OF HEAVY SOLIDS

As seen in FIGS. 6, 8, 10, 12, 14, and 16, the digester 190 includes a draft tube 10. An upper end 71 of the draft tube is located in the top section 115 of the digester and a lower end 72 of the draft tube is located in the conical bottom section 192 of the digester. The lower end of the draft tube is located close to the relatively small bottom 191 of the digester, where heavy solids tend to accumulate.

Figure 8:
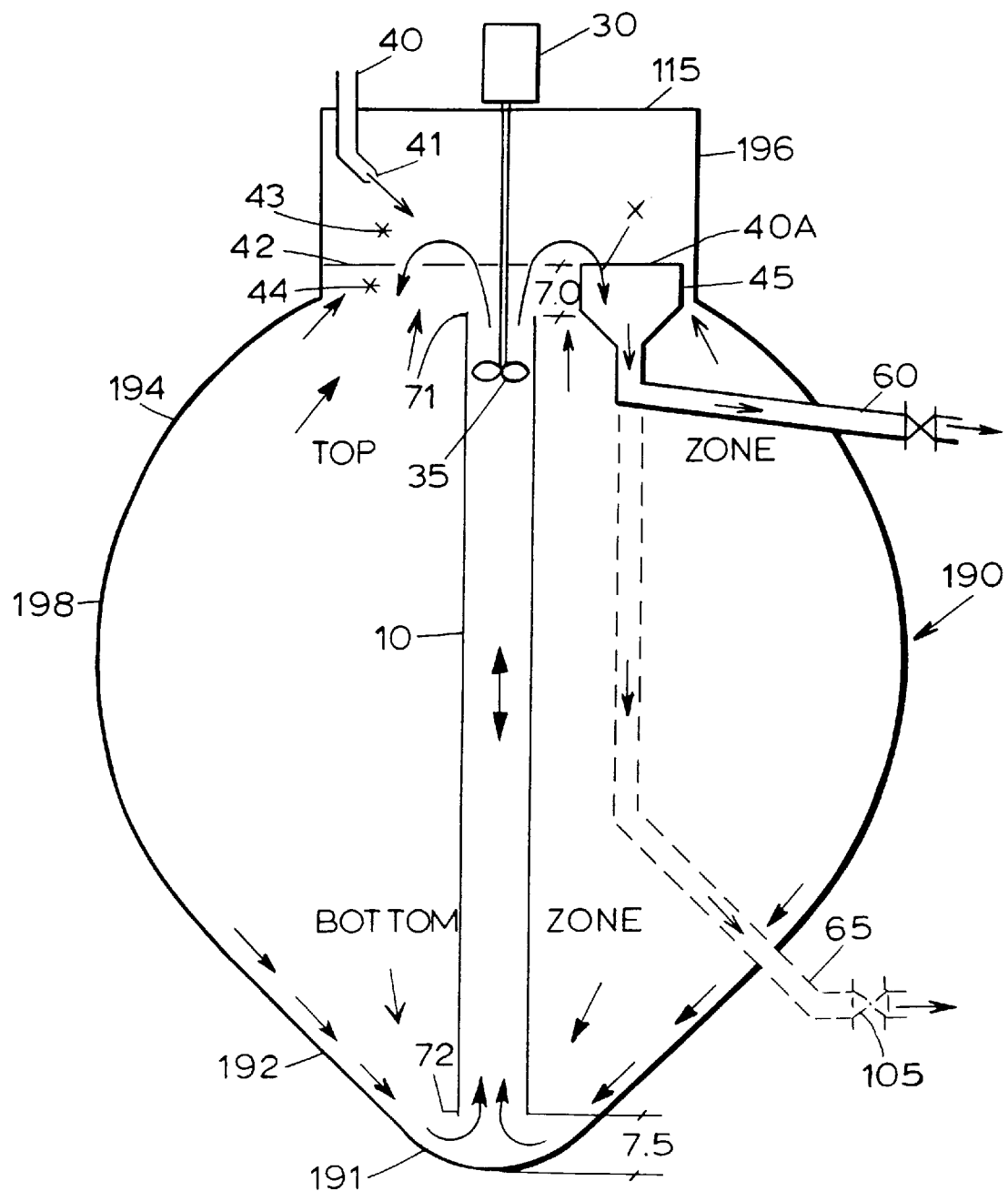
FIG. 8 is an elevational view of an alternative embodiment of an anaerobic digester in accordance with the present invention.
Figure 10:
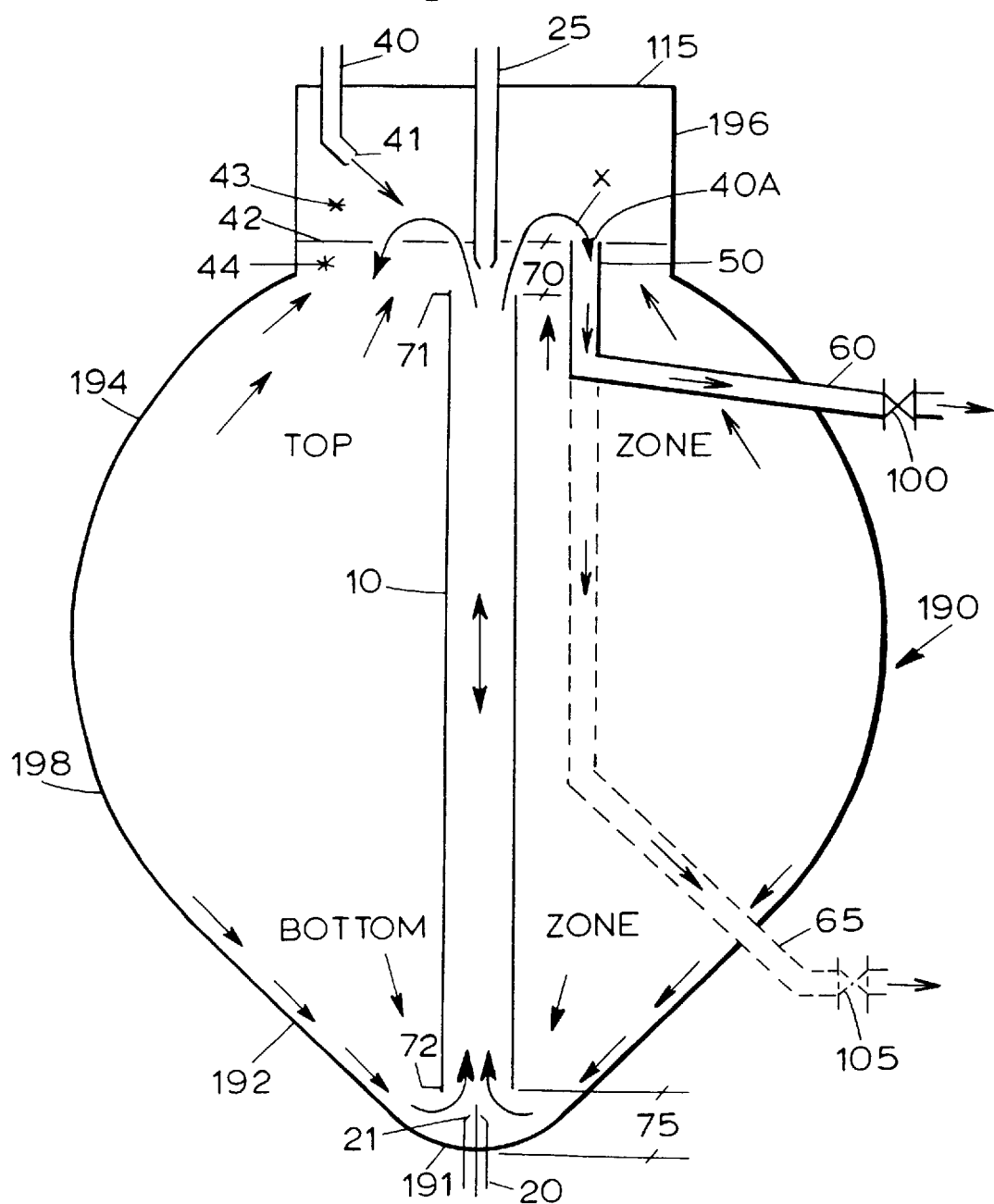
FIG. 10 is an elevational view of a third embodiment of a digester in accordance with the present invention.
Figure 11:
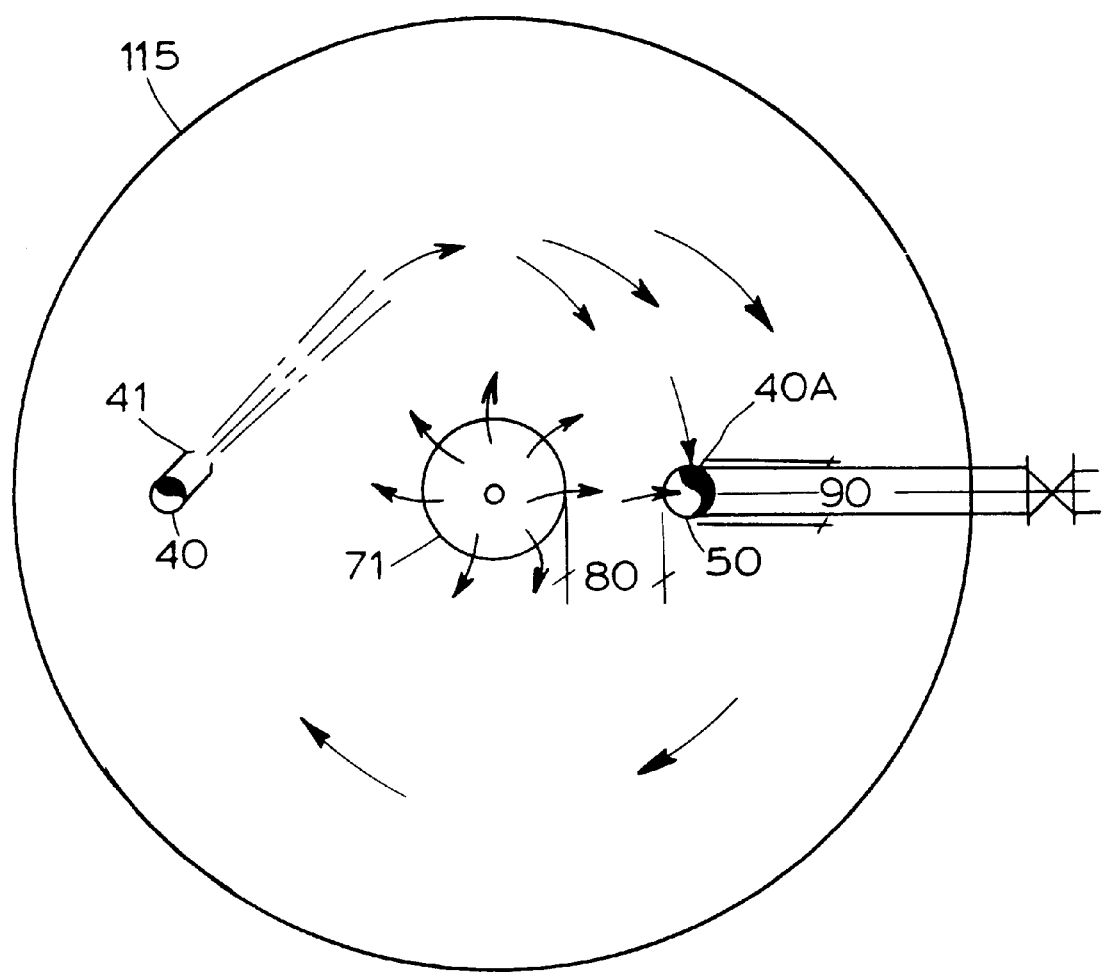
FIG. 11 is a plan view of the digester of FIG. 10.
Figure 12:
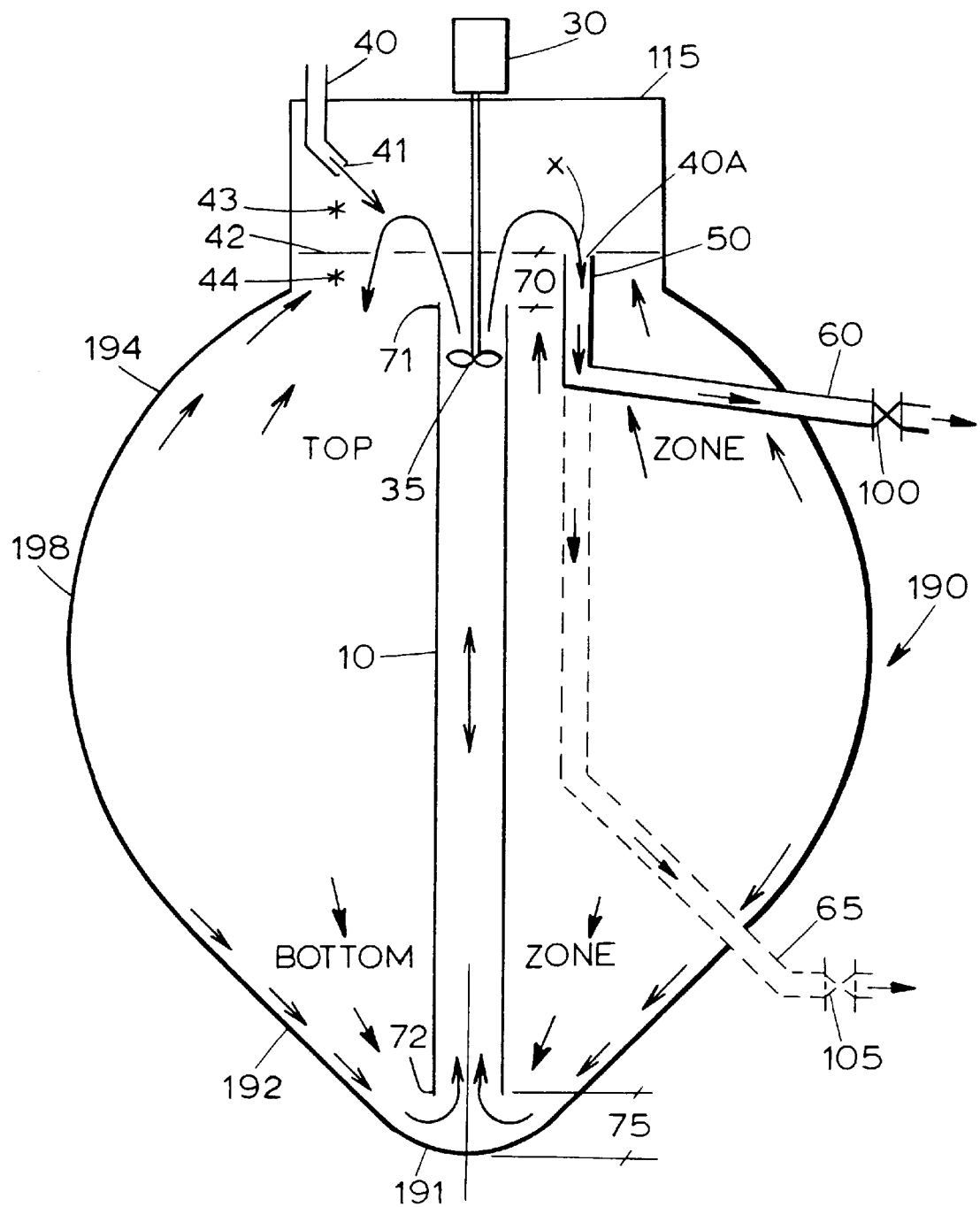
FIG. 12 is an elevational view of a fourth embodiment of a digester in accordance with the present invention.
Figure 13:
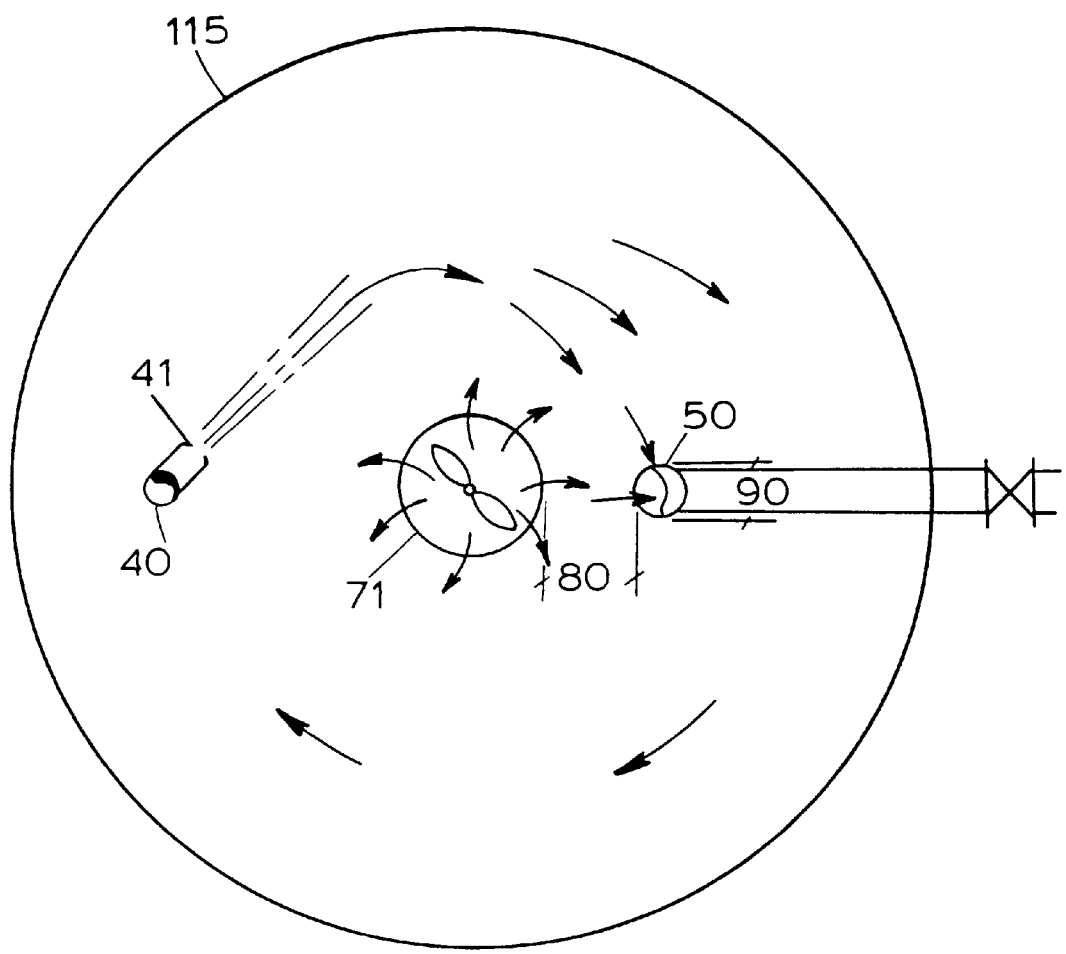
FIG. 13 is a plan view of the digester of FIG. 12.
Figure 14:
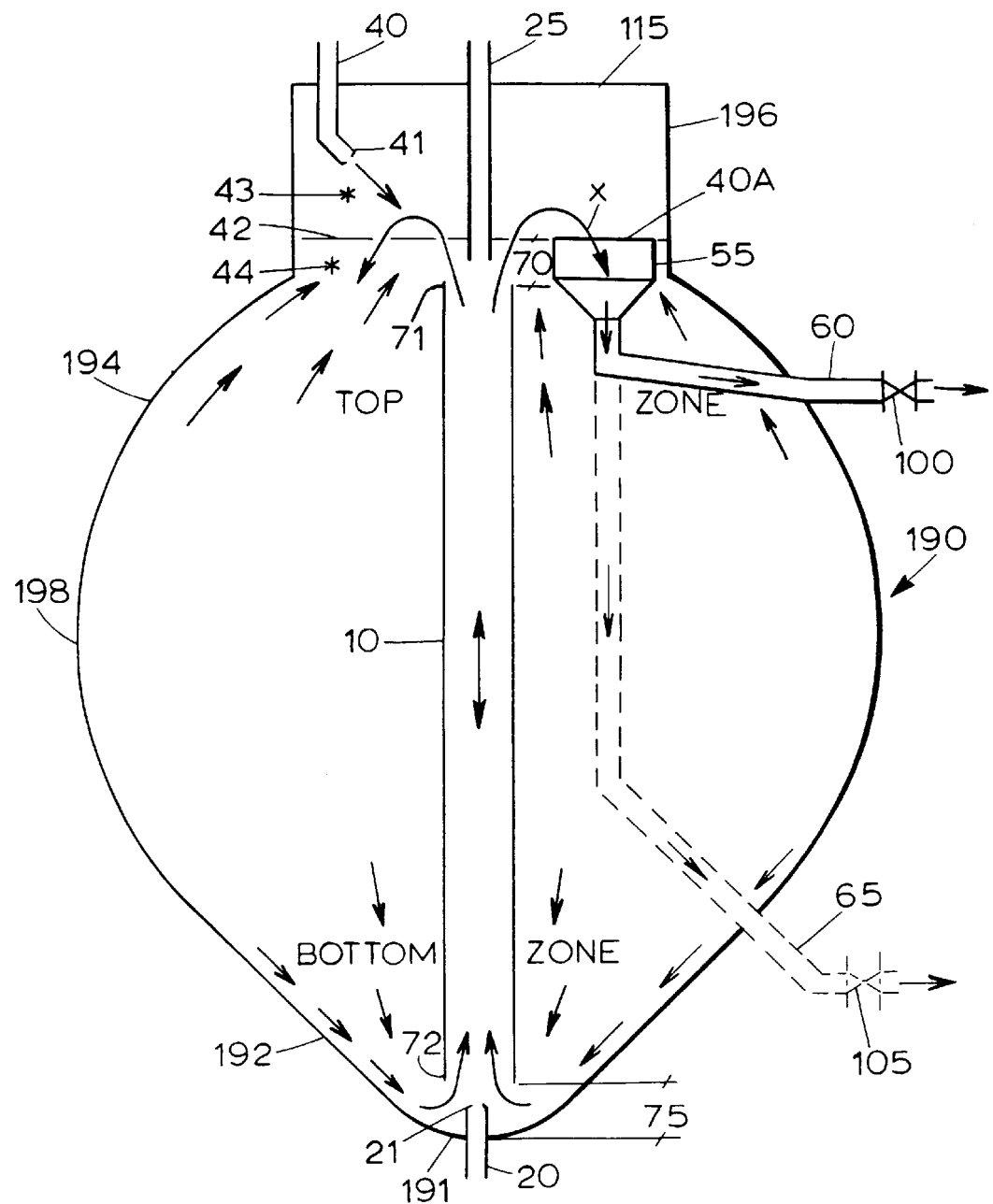
FIG. 14 is an elevational view of a fifth embodiment of a digester in accordance with the present invention.
Figure 15:
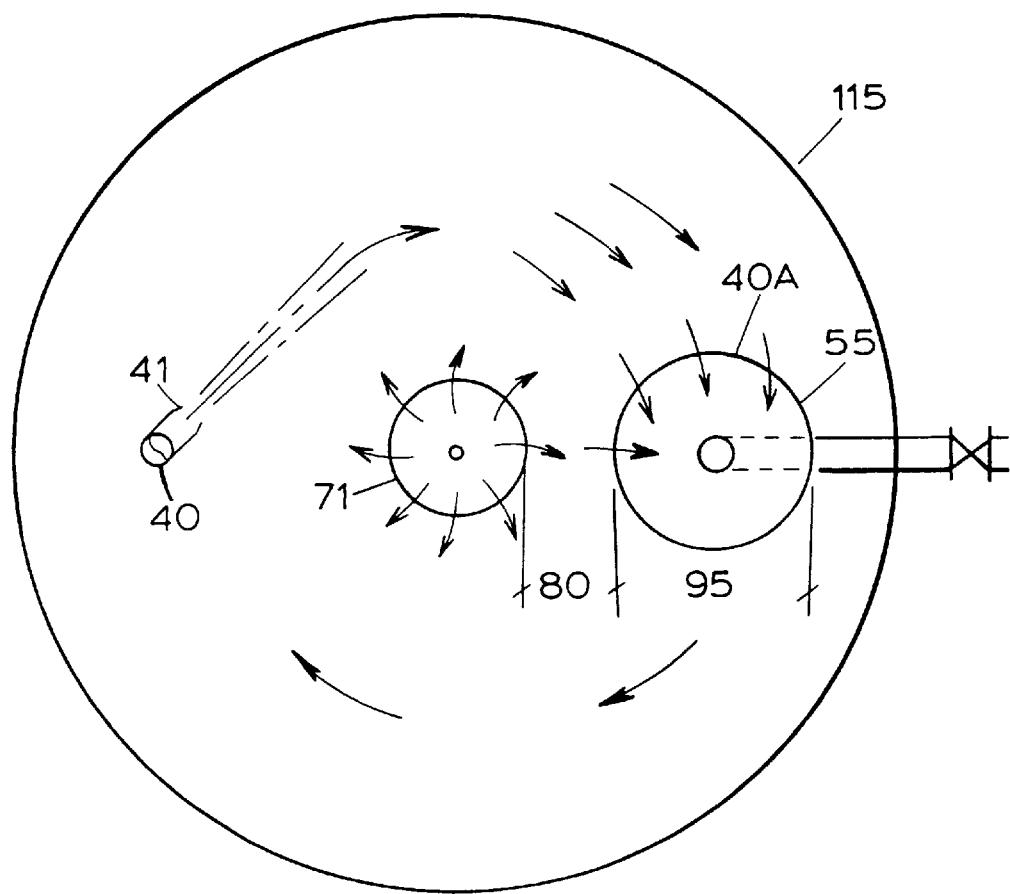
FIG. 15 is a plan view of the digester of FIG. 14.
Figure 16:
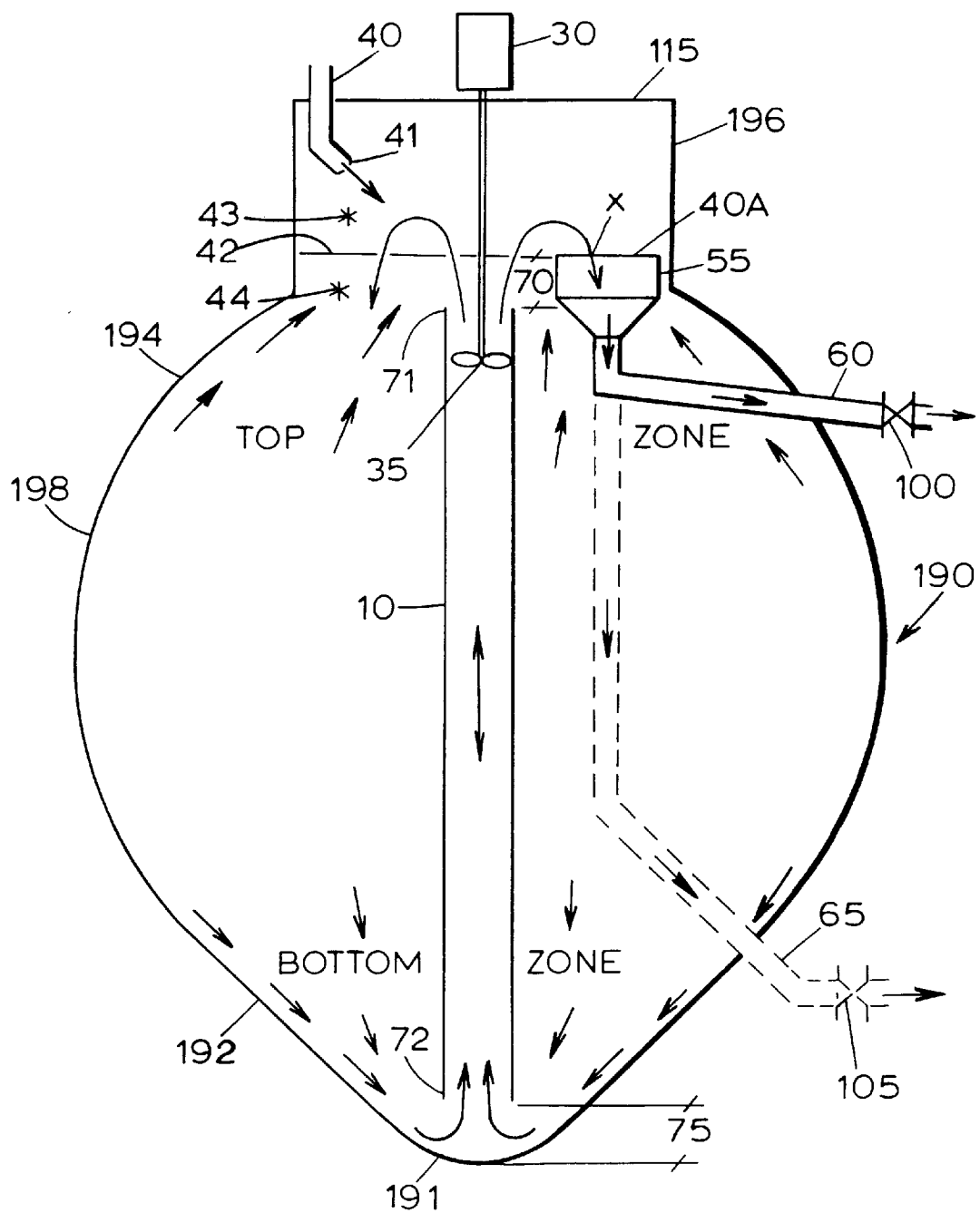
FIG. 16 is an elevational view of a sixth embodiment of a digester in accordance with the present invention.
Figure 17:
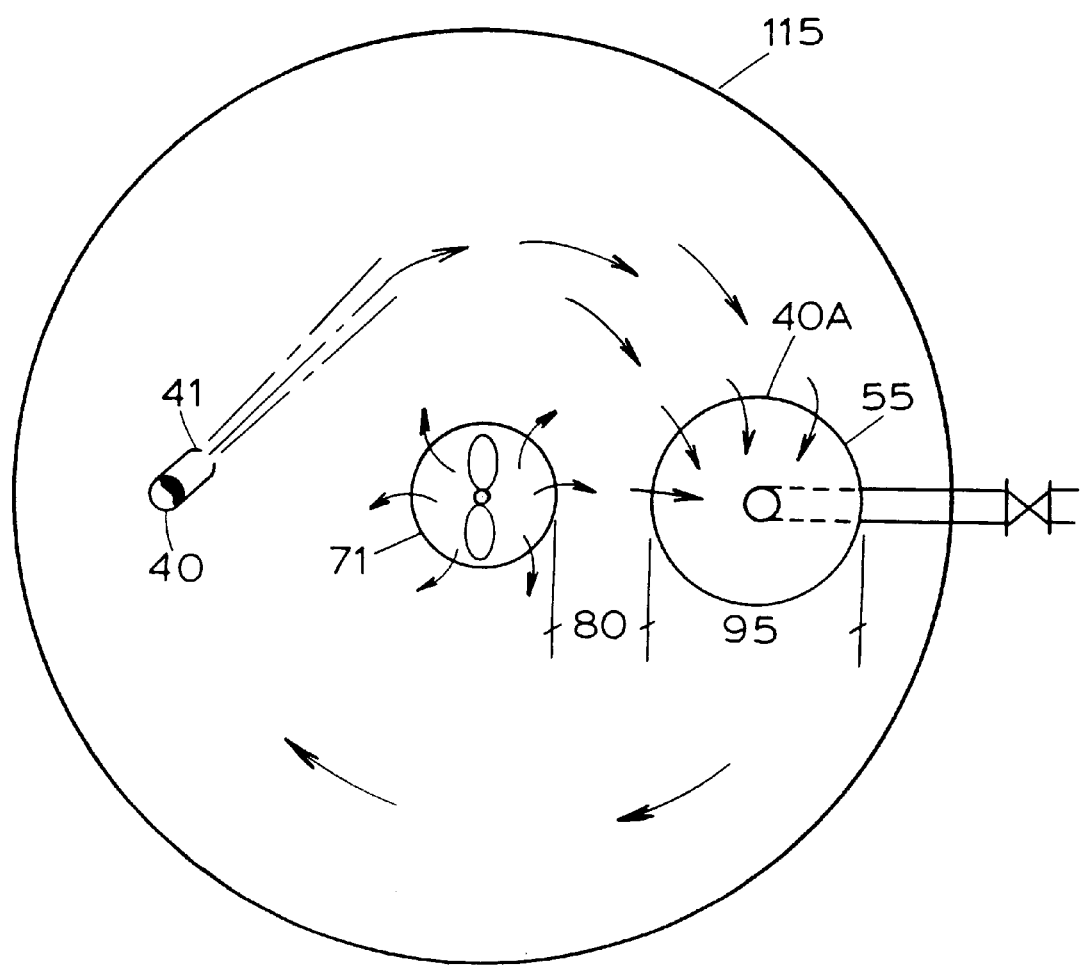
FIG. 17 is a plan view of the digester of FIG. 16.

As illustrated in FIGS. 6, 10, and 14, a first jet pump 20 is set in the bottom section 192 of the digester 190 to provide the energy necessary to carry large quantities of heavy solids from the bottom section up through the draft tube to the top section 115 of the digester. FIGS. 8, 12, and 16 show an alternative mechanism for pumping liquid through the draft tube 10, comprised of a mechanical mixing pump 30 located in the top section of the digester, with an impeller 35 suspended in the draft tube.

Upflow of heavy solids from the bottom section 192 of the digester allows the removal of heavy materials through a horizontal discharge mouth 40A within the digester. It is preferable that the heavy solids be transported upwards from the bottom section of the digester with sufficient velocity to develop a plume rising above the normal liquid surface 42. The plume causes a flow of heavy solids to spread outward over the liquid surface. As the flow spreads outwardly, the height of the liquid eventually returns to the normal liquid level at a point X. Before the heavy solids settle and migrate downward into the main mass of the digester, a portion of the flow travels over the edge of the discharge mouth 40A, allowing some of the solids to be discharged through a discharge pipe 60 or 65 extending from the discharge mouth 40A.

As seen in FIGS. 6, 8, 10, 12, 14, and 16, the discharge mouth 40A is located above the upper end 71 of the draft tube 10. By design, it also serves as a simple overflow weir to help maintain a constant liquid level in the digester 190. As seen in FIGS. 7, 9, 11, 13, 15, and 17, the mouth 40A is also laterally separated from the draft tube by a separation distance 80. Preferably, this distance is approximately three quarters of the distance from the draft tube to the point X at which the height of the liquid being pumped from the bottom section of the digester returns to the normal liquid level. The actual elevation and lateral separation of the discharge mouth 40A in relation to the draft tube 10 is a function of the operating level of the draft tube 10 and the exit velocity of fluid flowing from the draft tube 10. The discharge mouth 40A may be located at an elevation above, below or even with the elevation of the top of the draft tube 10, and due to the exit velocities of fluids discharging from the draft tube 10, lateral separation of the discharge mouth 40A, with respect to the draft tube 10, may not be acceptable. Therefore, it is foreseen that the mouth 40A may be connected to the draft tube 10.

Figure 7:
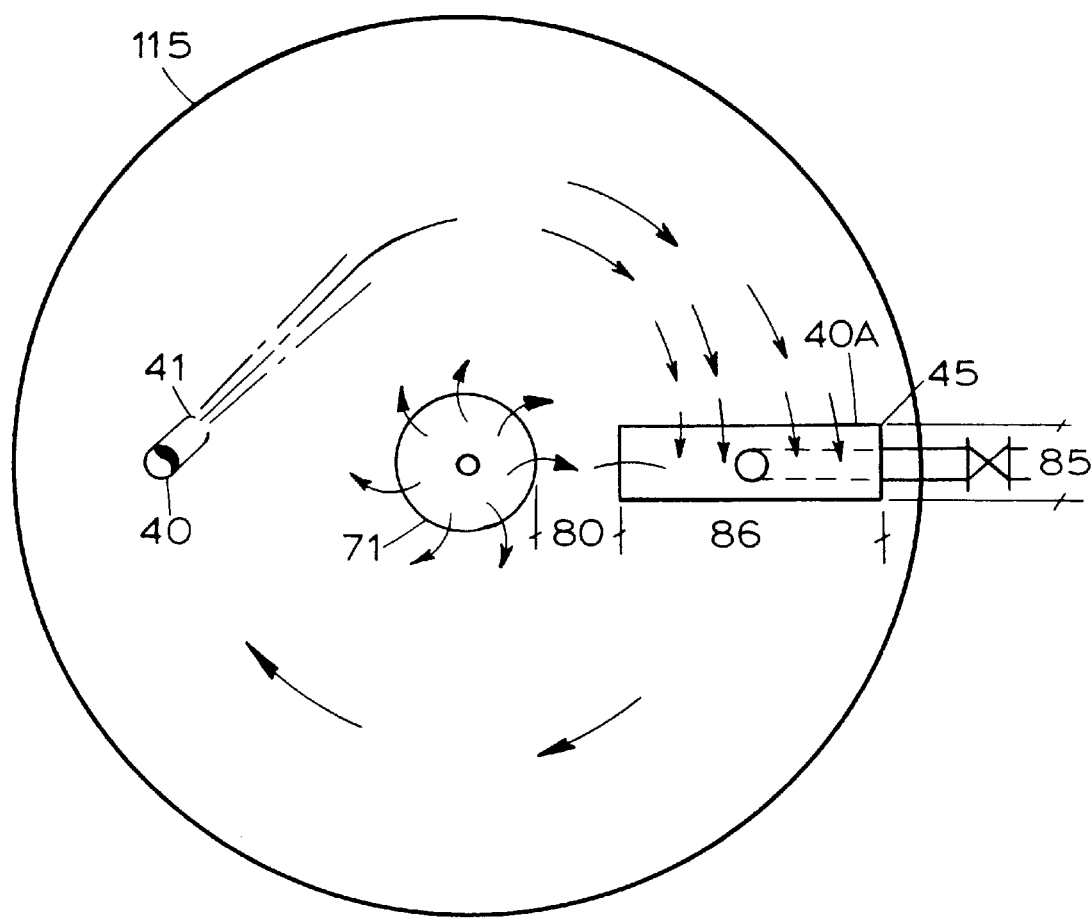
FIG. 7 is a plan view of the digester of FIG. 6.
Figure 9:
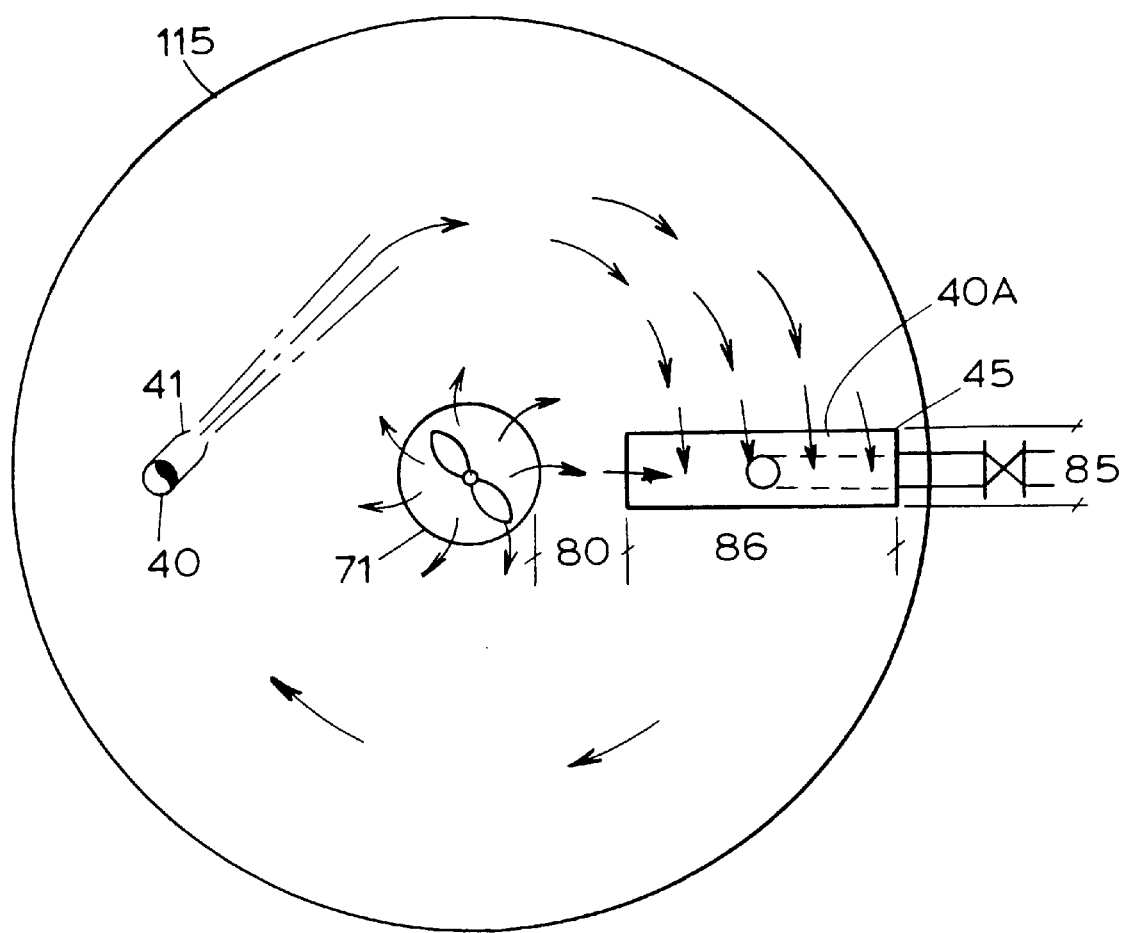
FIG. 9 is a plan view of the digester of FIG. 8.

FIGS. 6–9 illustrate the discharge mouth 40A formed on a trough 45. FIGS. 7 and 9 show the lateral position of the discharge trough relative to the upper end 71 of the draft tube 10. The narrow width 85 of the trough is set to provide adequate heavy solids removal but is not set so wide that clumps of fibrous materials that may form on the liquid surface are likely to enter the trough and clog the discharge pipe.

FIGS. 10–13 illustrate an alternate embodiment of a sludge discharge system. In this embodiment, the horizontal mouth 40A is formed on a standpipe 50. With a smaller mouth, this configuration is particularly effective in preventing unduly large clumps of fibrous material from entering and clogging the discharge pipe.

FIGS. 14–17 illustrate a third embodiment of a discharge system. In this embodiment, the horizontal mouth 40A is formed on a funnel 55. The illustrated funnel presents the largest frontal area for the discharge of heavy solids pumped to the surface though the draft tube. However, it also presents a significant risk of large clumps collecting and clogging the discharge pipe. Accordingly, this configuration may be most preferable when the raw sludge being digested contains relatively little fibrous material, and thus inherently has a relatively low risk of clump-formation.

In addition to being operated to transport heavy solids to the surface, the draft tube 10 is periodically operated to transport digestion liquid 44 from the top of the digester downward for discharge into the bottom section of the digester 190. Near the bottom of the digester, the high-volume, high-velocity flow spreads throughout the bottom section of the digester to help to reduce liquid density stratification, which can otherwise have a detrimental effect on upflow pumping capacity.

In the embodiments of the invention illustrated in FIGS. 6, 10, and 14, downflow capability is provided by a second jet pump 25 located in the gas-collecting section 196 of the digester 190. In the embodiments of the invention illustrated in FIGS. 8, 12, and 16, the mechanical mixing pump 30 is a reversible unit that can change pumping action of the impeller 35 to either upward pumping or downward pumping.

The pumping system for the draft tube may be computer-controlled so that upflow and downflow sequences can be automatically cycled to assure optimum heavy solids suspension and dispersion, thus optimizing the capabilities for heavy solids removal under varying conditions of sludge density stratification in the digester. Flow sequences can be managed by an automated time allotment system. Any combination of upward and downward flow times can be utilized. Full cycles may be repeated automatically for an indefinite time until changed by the operations staff.

The timing of discharge of heavy solids from the bottom section 192 of the digester 190 is directly dependent upon the amount of raw sludge fed to the digester. The amount of heavy solids discharged during a typical day can be regulated by adjusting the number of upflow and downflow pumping sequences relative to the daily schedule for feeding raw sludge to the digester.

The described heavy solids transport provides a positive and trouble-free method for collecting and discharging heavy solids from the bottom section 192 of the digester 190. It also provides easy vessel level control without an undue risk of clogging small diameter pipes or the conventional damage that a valve or pump malfunction will lead to catastrophic discharge of the contents of the digester.

FOAM, FROTH, AND/OR EMULSION CONTROL

Foam, froth, and/or emulsion control capacity is provided in part by mass displacement resulting from liquid from the bottom section of the digester being pumped to the surface through the draft tube 10. The high flow velocities through the draft tube causes turbulent flow conditions in the plume, which projects upward into the foam, froth, and/or emulsion layer 43 at the surface in the digester. The turbulent movement of the heavy solids in the foam, froth, and/or emulsion zone 43 breaks up that otherwise-stable layer, causing the mixture to sink back into the liquid. The outward spread of the heavy materials also helps to suppress the movement of light solids into the gas zone above the liquid, where they tend to produce foam, froth, or emulsions. By suppressing that movement, the spray helps to minimize growth of the foam, froth, or emulsion layer 43.

Foam, froth, and emulsions are further reduced by a nozzle 40 that is supplied with circulated digestion liquid to discharge a high-velocity spray at an angle to the liquid surface within the digester. The discharge through the spray nozzle helps to break down foam, froth, and/or emulsions, releasing gas and causing the remaining materials to return to the liquid. The nozzle is located off-center in the top section 115 of the digester (as shown in FIGS. 6–17) to create a swirl motion in the top of the digester liquid and the foam, froth, and/or emulsions. The angle of the nozzle can be any angle from 10 degrees to 80 degrees relative to the liquid surface, with 45 degrees being considered to be the optimum angle. The swirling allows the nozzle 40 to continually break down new foam, froth, and/or emulsions.

REMOVAL OF SCUM AND MATS

Each of FIGS. 6, 8, 10, 12, 14, 16, and 18 illustrates two alternate discharge pipes 60, 65 extending from the discharge mouth 40A. The top pipe 60 minimizes the internal piping and therefore the potential for difficult maintenance. The lower pipe 65 gives maximum clog clearing capacity but has longer more complex internal piping. Alternate locations for the discharge pipe exit from the anaerobic digester may also be acceptable.

An automatically controlled shut-off valve 100 or 105 can be used in a method for effectively removing scum and minor clumps of fibrous materials and other light solids from the liquid surface. The valve can be closed periodically during a raw sludge feed cycle, causing the liquid surface 42 in the digester 190 to rise. As the liquid level rises, the spray system may be turned on to create a swirl in the liquid surface. Once swirling motion begins, the valve can be opened to cause a quick release of an accumulated volume of liquid above the discharge mouth 40A. The swirl causes scum and minor clumps of fibrous materials and the light solids to flow into the discharge mouth 40A, where they are discharged.

The length 86 of the discharge trough illustrated in FIGS. 7 and 9 is set to take maximum advantage of this method of discharging scum and minor clumps.

The flow to the spray nozzle may be computer-controlled and independently cycled for any operation time cycle coupled with an appropriate closing of the shutoff valve 100 or 105 to control foam, froth, or emulsions. It may also be synchronized for operation with discharge of stabilized sludge.

The foregoing detailed description has been given for clearness of understanding only, and no unnecessary limitations should be understood therefrom, as modifications will be obvious to those skilled in the art.

What is claimed is:

1. An anaerobic sludge digester comprising:
    a vessel for containing a volume of digester liquid, the vessel having a shell with a top, a bottom, and sloped sides leading to the bottom;
    a draft tube with an upper end near the vessel top and a lower end near the vessel bottom;
    discharge mouth positioned near the upper end of the draft tube;
    means for pumping liquid from near the vessel bottom through the draft tube to near the vessel top;
    and for discharging both heavy solids and light solids through the discharge mouth.
2. The digester as recited in claim 1, further comprising means for pumping liquid from near the vessel top through the draft tube to near the vessel bottom.
3. The digester as recited in claim 2, in which at least one of the means for pumping liquid through the draft tube comprises a jet pump.
4. The digester as recited in claim 2, in which at least one of the means for pumping liquid through the draft tube comprises a mechanical mixer.
5. The digester as recited in claim 2, in which at least one of the means for pumping liquid through the draft tube comprises a propeller.
6. The digester as recited in claim 1, in which the discharge mouth is part of a trough having a long side extending inward from the vessel shell.
7. The digester as recited in claim 1, in which the discharge mouth is part of a funnel.
8. The digester as recited in claim 1, in which the discharge mouth is part of a weir.
9. The digester as recited in claim 1, in which the means for discharging comprises a discharge line that exits the vessel at or above midheight of the vessel.
10. The digester as recited in claim 1, in which the means for discharging comprises a discharge line that exits the vessel below midheight of the vessel.
11. The digester as recited in claim 1, in which the means for discharging comprises a discharge line with a shut-off valve.
12. The digester as recited in claim 1, in which the discharge mouth comprising means for controlling the level of the liquid in the digester.
13. The digester as recited in claim 1, further comprising a spray nozzle comprising means for creating motion in foam, froth, or emulsions forming on the surface of the liquid.
14. The digester as recited in claim 13, in which the spray nozzle comprising means for knocking down foam near the vessel top.
15. The digester as recited in claim 1, in which the vessel is generally egg-shaped.
16. The digester as recited in claim 1, in which the discharge mouth is located above the upper end of the draft tube.
17. An anaerobic sludge digester comprising:
    a vessel for containing a volume of digester liquid, the vessel having a top section enclosed by cylindrical walls, a bottom, and sloped sides leading to the bottom;
    a draft tube with an upper end near the vessel top section and a lower end near the vessel bottom;
    means for pumping liquid from near the vessel bottom through the draft tube into the top section; and
    means for discharging heavy solids through a discharge mouth located above the upper end of the draft tube.
18. A method for digesting anaerobic liquids comprising the steps of:
    providing a digester with walls defining a top section, a bottom, and sloped sides leading to the bottom; and a draft tube with an upper end near the digester top and a lower end near the digester bottom;

introducing a volume of liquid into the digester;

pumping heavy-solids laden liquid from near the digester bottom through the draft tube to near the digester top; and discharging a portion of the heavy-solids laden liquid through a discharge mouth positioned above the upper end of the draft tube and laterally inwardly from the walls defining the top section.

19. The method as recited in claim 18, and comprising the further step of pumping liquid from near the top section through the draft tube to near the digester bottom.

20. The method as recited in claim 18, and comprising the further steps of increasing the level of liquid in the digester substantially above the discharge mouth, and subsequently rapidly drawing off a large volume of liquid through the discharge mouth.

21. A method for digesting anaerobic liquids comprising the steps of:

providing a digester with walls defining a top section, a bottom, and sloped sides leading to the bottom; and a draft tube with an upper end near the top section and a lower end near the digester bottom; a spray nozzle mounted near the top section; and a discharge mouth for heavy solids disposed within the top section;

introducing a volume of liquid into the digester;

pumping liquid from near the digester bottom through the draft tube to near the top section;

closing the discharge mouth while, liquid is introduced, resulting in the liquid level rising above the discharge mouth; and using the spray nozzle to create motion in foam, froth, or emulsions forming on the surface of the liquid in the digester.

22. The method as recited in claim 21, and comprising the further steps of:

increasing the level of liquid in the, digester substantially above the discharge mouth;

using the spray nozzle to create a swirl in the top surface of the liquid;

shutting off the spray nozzle; and opening the discharge system to rapidly drawing off a large volume of liquid through the discharge mouth.

23. The method as recited in claim 21, and comprising the further step of using the spray nozzle to knock down foam near the top section.

\* \* \* \* \*